United States Patent
Cho

(10) Patent No.: US 6,198,468 B1
(45) Date of Patent: Mar. 6, 2001

(54) APPARATUS FOR PERFORMING VARIOUS ON-SCREEN DISPLAY FUNCTIONS AND METHODS FOR EACH FUNCTION

(75) Inventor: Sung-il Cho, Seongnam (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 08/969,101

(22) Filed: Nov. 13, 1997

(30) Foreign Application Priority Data

Nov. 13, 1996  (KR) .................................................. 96-53827

(51) Int. Cl.$^7$ ....................................................... G06F 1/04
(52) U.S. Cl. .......................... 345/141; 248/917; 348/497
(58) Field of Search ..................... 345/141, 112, 345/127, 193, 213, 194, 150, 157, 418; 348/497, 569; 248/917; 370/516; 375/226, 224, 371, 354; 702/66, 69

(56) References Cited

U.S. PATENT DOCUMENTS

| | | | |
|---|---|---|---|
| 4,388,621 | * | 6/1983 | Komatsu et al. ...................... 345/213 |
| 4,646,077 | * | 2/1987 | Culley ................................... 340/748 |
| 4,789,855 | * | 12/1988 | Ozeki ..................................... 345/150 |
| 4,864,518 | * | 9/1989 | Kurita ................................... 345/141 |
| 5,400,052 | * | 3/1995 | Otake et al. ........................... 345/127 |
| 5,608,425 | * | 3/1997 | Movshovich .......................... 345/141 |

* cited by examiner

*Primary Examiner*—Mary R. Powell
*Assistant Examiner*—Thu-Thao Havan
(74) *Attorney, Agent, or Firm*—Marger, Johnson & McCollom, P.C.

(57) ABSTRACT

An apparatus having various on-screen display (OSD) functions and methods for each function are provided. The apparatus includes an on-screen display device for receiving serial data having a RAM write address, a ROM address, and the on-screen display functions. The apparatus synthesizes a character signal corresponding to serial data with a background color signal or an external composite video signal in response to an internal or external composite synchronous signal and provides the result to a monitor. The apparatus also includes a synchronous signal generating device for generating internal horizontal and vertical synchronous signals upon receiving a main clock signal, synthesizing means for synthesizing an internal equalization pulse with the internal horizontal and vertical synchronous signals, and means for determining the internal composite synchronous signal or the external composite synchronous signal extracted from the composite video signal. A control device is also part of the OSD apparatus. The control device outputs user serial data to the on-screen display device, generates the main clock signal from a system clock, and controls the on-screen display device and the synchronous signal generating device.

24 Claims, 6 Drawing Sheets

FIG. 2B  address(N)  data(N)  data(N+1)

APPARATUS FOR PERFORMING VARIOUS ON-SCREEN DISPLAY FUNCTIONS AND METHODS FOR EACH FUNCTION

BACKGROUND OF THE INVENTION

The present invention relates to an on-screen display (OSD), and more particularly, to an apparatus for performing various on-screen display functions for displaying a character on a screen in various forms and a method for performing each function.

An OSD apparatus generates and displays a character in similar manner to a typical liquid crystal display (LCD) controller. However, unlike an LCD controller, the OSD apparatus displays the character together with a moving picture signal.

The OSD apparatus separates and detects horizontal and vertical synchronous signals from a composite synchronous picture signal and uses the detected horizontal and vertical signals as picture synchronous signals. An Automatic Frequency Controller (AFC) is then used to display the character synchronized with the picture signal without scattering or distortion. The AFC is part of the Phase Locked Loop (PLL) and can be any one of various types. Typically, a Frequency Synthesized PLL is used for on screen displays. The PLL is used for compensating for the phase and frequency difference of the external composite video signal. However, in the prior art, the state of synchronous signals included in the external composite video signal is erratic when a pseudo composite video signal including, for example, a guard signal, is input to the frequency synthesized PLL. The PLL cannot compensate well for erratic synchronous signals present in the composite video signal. Also, in a conventional OSD apparatus characters are displayed on a background screen or with a video signal.

Thus, there is a need for an OSD apparatus which includes new and convenient functions, consumes less power, and is small and lightweight.

SUMMARY OF THE INVENTION

It is an object of the present invention to provide an apparatus which performs various on-screen display (OSD) functions.

It is another object of the present invention to provide an apparatus which performs a half-tone conversion function in which a character display region is highlighted by darkening a character relative to a background region.

It is a further object of the present invention to provide an apparatus which performs a box drawing function in which a displayed character or sentence is highlighted by shading the displayed character or sentence with a box having a protruded or a recessed cubic effect.

It is a further object of the present invention to provide an apparatus which performs a scroll function in which the on/off character functions of the OSD are controlled by a horizontal line sequence.

It is a further object of the present invention to provide an apparatus which performs a blinking function which blinks a displayed character.

It is a further object of the present invention to provide a method for performing the half-tone conversion function.

It is a further object of the present invention to provide a method for performing the box drawing function.

It is a further object of the present invention to provide a method for performing the scroll function.

It is a further object of the present invention to provide a method for performing the blinking function.

To achieve an object of the invention there is provided an apparatus for performing a plurality of on-screen display functions on a character. The apparatus includes a control means for receiving user data and a system clock signal and generating serial data and a main clock signal and synchronous signal generating means coupled to said control means for receiving the main clock signal and a composite video signal, generating an equalization pulse and internal horizontal and vertical synchronous signals responsive to the main clock signal, generating an internal composite synchronous signal by synthesizing the internal equalization pulse with the internal horizontal and vertical synchronous signals, and generating an external composite synchronous signal corresponding to the composite video signal. The apparatus also includes on-screen display means for receiving the serial data and either the internal or the external composite synchronous signal from the synchronous signal generating means, generating a character signal responsive to either the internal or the external composite synchronous signals, and providing the character signal to a monitor for displaying the character.

To achieve a further object of the invention there is provided an apparatus for performing a plurality of on-screen display functions, the apparatus receiving a composite video signal and user data, the apparatus including interface means for receiving serial data having a ROM address and at least one on-screen display function and converting the serial data into parallel data and a RAM coupled to said interface means for storing the parallel data. The apparatus also includes a ROM coupled to said RAM for storing character data of a character to be displayed and level adjusting means for generating level-adjusted character data by adjusting the DC level of the character data corresponding to the parallel data. Signal synthesizing means coupled to said level adjusting means for generating a synthesized character signal by synthesizing the level-adjusted character data with either the externally input composite video signal or an internally generated background color signal and providing the synthesized character signal to a monitor for displaying the character.

BRIEF DESCRIPTION OF THE DRAWINGS

The above objects and advantages of the present invention will become more apparent by describing in detail a preferred embodiment thereof with reference to the attached drawings in which:

FIGS. 2A through 2E are signal waveforms from interface portion 40 shown in FIG. 1;

FIG. 3 is a diagram illustrating horizontal and vertical start position signals;

DETAILED DESCRIPTION OF THE INVENTION

Figure 1:
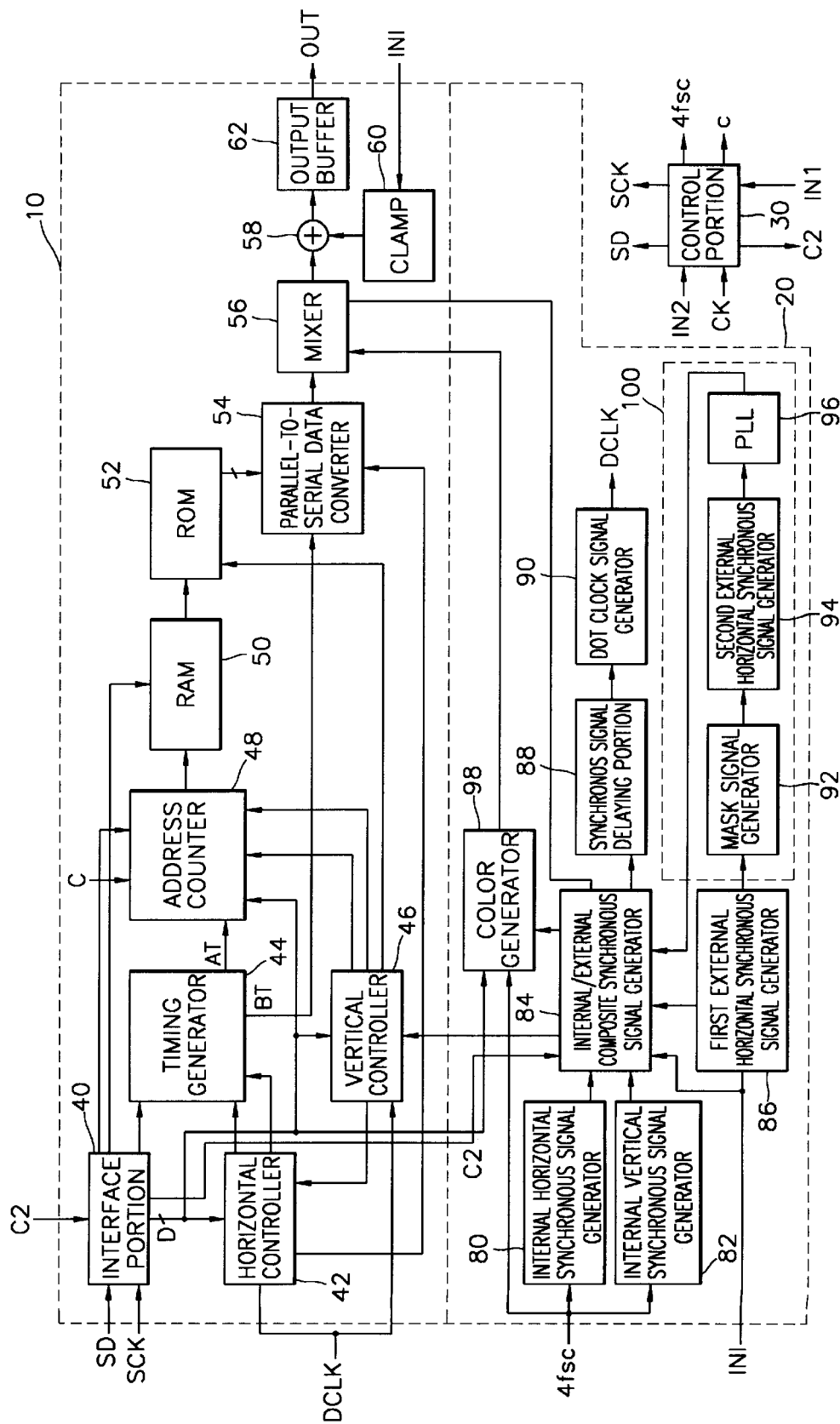
FIG. 1 is a block diagram of an apparatus performing various on-screen display (OSD) functions according to the present invention.

As shown in FIG. 1, an apparatus performing various OSD functions according to the present invention includes an OSD portion 10, a synchronous signal generating portion 20, and a control portion 30. The OSD portion 10 includes an interface portion 40, a horizontal controller 42, a timing generator 44, a vertical controller 46, an address counter 48, a RAM 50, a ROM 52, a parallel-to-serial data converter 54, a mixer 56, a signal synthesizer 58, a clamp 60, and an output buffer 62. Synchronous signal generating portion 20 includes an internal horizontal synchronous signal generator 80, an internal vertical synchronous signal generator 82, an internal/external composite synchronous signal generator 84, a first external horizontal synchronous signal generator 86, a synchronous signal delaying portion 88, a dot clock signal generator 90, a mask signal generator 92, a second external horizontal synchronous signal generator 94, a phase-locked loop (PLL) 96 and a color generator 98. Mask signal generator 92, second external horizontal synchronous signal generator 94, and Phase-Locked Loop (PLL) 96 constitute video signal compensating portion 100.

OSD portion 10 includes a storing portion and a character control portion. In synchronous signal generating portion 20, horizontal and vertical signals are detected and separated from a composite video signal input at input node IN1. Synchronous signal generating portion 20 also detects the existence of a synchronous signal. If a synchronous signal exists, synchronous generating portion 20 generates various synchronous signals.

Control portion 30 generates a main clock 4 fsc upon receiving a clock signal CK and various control signals for controlling OSD portion 10 and synchronous signal generating portion 20. Control portion 30 determines whether the composite video signal is received externally via input node IN1 and generates a corresponding control signal C2. Control portion 30 provides control signal C2 to external/internal synchronous signal generating portion 84 via interface portion 40. Internal/external composite synchronous signal generating portion 84, in turn, determines whether to output the internal composite synchronous signal or the external composite synchronous signal responsive to control signal C2. That is, internal/external composite synchronous signal generator 84 outputs the internal composite synchronous signal if the external composite video signal is not input and outputs the external composite synchronous signal if the external composite video signal is input.

FIGS. 2A–2E are waveform diagrams of clock, signal, serial data SD, a write data clock signal, a write address clock signal, and a write address preset enable signal, respectively.

Interface portion 40 receives serial data SD shown in FIG. 1. Serial data SD can be a RAM write address for writing a ROM address into RAM 50, a ROM address used for storing character data in ROM 52, and control data used for the various OSD functions. Interface portion 40 stores the received RAM write address in, for example, an internal shift register (not shown) responsive to clock signal (shown in FIG. 2A) and outputs the ROM address in parallel by synchronizing the shift register data with the write data clock signal shown in FIG. 2C. Also, interface portion 40 outputs signals required for writing data in RAM 50 and for controlling timing generator 44. Furthermore, interface portion 40 generates blank data from RAM 50 when erasing all data stored in RAM 50.

Horizontal controller 42 generates horizontal signal information, such as the horizontal size and the horizontal start position of the character to be displayed. That is, when the vertical size of a character and vertical start position signal generated from vertical controller 46 are input, a horizontal start position signal is determined according to an internal or external horizontal synchronous signal based on the value of an internal register (not shown). The horizontal size of the character to be displayed is determined by classifying a first line and the remaining lines. Character size data is generated in order to display a maximum of 30 characters in the horizontal direction. In addition, horizontal controller 42 generates an original clock signal according to the selected horizontal character size and outputs the generated clock signal to parallel-to-serial data converter 54.

Timing generator 44 generates timing signals required for reading out data stored in RAM 50. Timing generator 44 receives the horizontal character size and the horizontal character start position signal output from horizontal controller 42 and outputs a boundary timing signal BT and an address timing signal AT to parallel-to-serial data converter 54 and address counter 48, respectively, responsive to the signals generated from interface portion 40.

Figures 2A, 2C, 2D, 2E, 3:
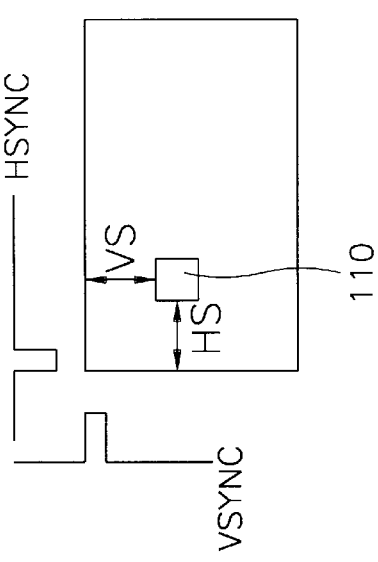

FIG. 3 shows horizontal and vertical positions HS and VS, respectively, of displayed character 110. Vertical controller 46 outputs the vertical start position signal and the vertical size of the character to be displayed. After an internal or external vertical synchronous signal is input to the internal/external composite synchronous signal generator 84, vertical controller 46 counts a horizonal synchronous signal based on the value of an internal register (not shown) to determine a vertical start position signal. In the same manner, vertical character size is determined by classifying a first line and the remaining lines. Then, vertical controller 46 counts a dot address clock signal generated according to the determined vertical character size to output an enable signal to ROM 52.

When data is written into RAM 50, address counter 48 receives the write address preset enable signal shown in FIG. 2E from interface portion 40 to preset a RAM write address in an internal counter (not shown). Address counter 48 then outputs a RAM write address to RAM 50 which is increased by the write address clock signal shown in FIG. 2D. Also, when data is read out from RAM 50, address counter 48 generates a RAM read address signal by receiving the address timing signal AT from timing generator 44 and the vertical size and vertical start position signal from vertical controller 46 and provides the generated RAM read address to RAM 50 responsive to control signal C output from control portion 30.

Parallel-to-serial data converter 54 receives parallel data output from ROM 52 and serially outputs character and boundary data to mixer 56 or outputs blank data regardless of the data output from ROM 52. Parallel-to-serial data converter 54 additionally receives boundary timing signal BT from timing generator 44 to output boundary blank data.

That is, parallel-to-serial data converter 54 outputs boundary blank data after loading the data output from ROM 52 into an internal register (not shown) and after the boundary timing signals are input to an internal register (also not shown). Parallel-to-serial data converter 54 performs the above-mentioned operation responsive to the clock signal generated by horizontal controller 42.

Figure 4A:
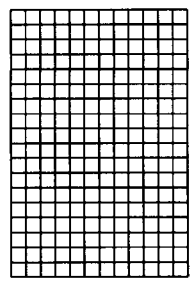
FIGS. 4A through 4D are diagrams illustrating different types of blanks.
Figure 4B:
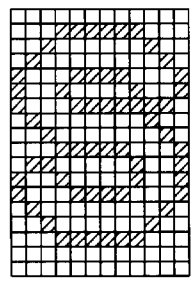
Figure 4C:
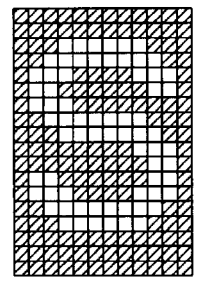
Figure 4D:
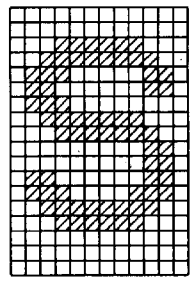

FIG. 4A is a character diagram which does not include a blank, FIG. 4B shows a boundary blank, FIG. 4C shows a raster blank, and FIG. 4D shows a character blank, respectively.

Parallel-to-serial data converter 54 outputs a horizontal display termination signal when the current boundary timing signal is input. Parallel-to-serial data converter 54 also outputs a raster blank signal for disabling the read enable signal when the previous boundary timing signal is input. Parallel-to-serial data converter 54 selects a blank from respective character lines and outputs blank data to mixer 56.

Mixer 56 mixes character data with a video signal. When a composite video signal is externally input, mixer 56 mixes and outputs the character and blank data output from parallel-to-serial data converter 54 with a background color signal output from color generator 98 and a video signal generated from synchronous signal generating portion 20. Color generator 98 receives the internal horizontal synchronous signal from internal/external composite synchronous signal generator 84 and the color information data included in parallel data D output from interface portion 40. Color generator 98 generates a color burst signal corresponding to the internal horizontal synchronous signal responsive to clock signal 4 fsc. Color generator 98 also generates a background color signal responsive to the color information data in parallel data D, a blank color signal, a raster color signal, and other similar color signals.

Clamp 60 controls the direct current (DC) level of the composite video signal externally input from input node IN1 and provides the resulting signal to signal synthesizer 58. Signal synthesizer 58 synthesizes the signal output from mixer 56 with the signal output from clamp 60 and provides the resulting synthesized signal to output buffer 62.

Figure 5:
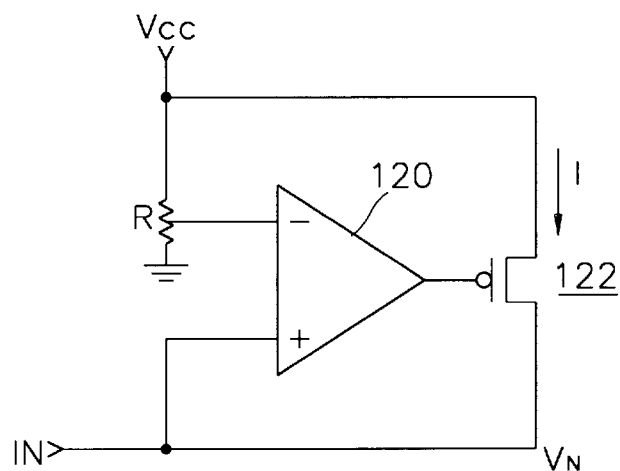
FIG. 5 is a circuit diagram of clamp 60 shown in FIG. 1.

FIG. 5 is a circuit diagram of clamp 60 shown in FIG. 1 according to a preferred embodiment of the present invention. Clamp 60 includes a variable resistor R connected between power supply voltage Vcc and a power supply voltage (e.g., ground) for generating a reference voltage. Clamp 60 further includes a comparator 120 for comparing the reference voltage with external composite video signal $V_N$ input via input node IN1 and providing the compared result as a comparison signal. Clamp 60 also includes a transistor 122 having a gate connected to the comparison signal and a drain and source which are connected between power supply voltage Vcc and the composite video signal $V_N$.

Figure 6:
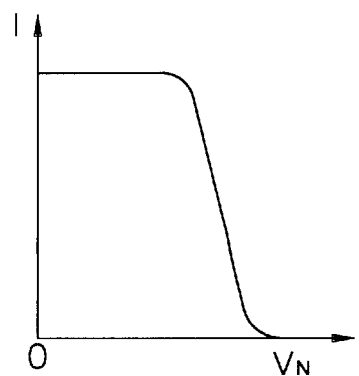
FIG. 6 is a graph showing the clamp level as a relationship between output current and input voltage of the circuit shown in FIG. 5.

FIG. 6 is a graph showing the clamp level of clamp 60 as it relates to the output current I and external composite video signal $V_N$ of the circuit shown in FIG. 5.

Clamp 60 circuit shown in FIG. 5 clamps the peak of a synchronous signal. A charge pump circuit having on-resistance $R_{on}$ of about 4 Ω shown in the following formula determines the current from the resistance of an external pull-down resistor.

$$R_{on} = \frac{dV_N}{dI}$$

wherein $dV_N$ and $dI$ represent the differential input voltage $V_N$ and output current I, respectively.

Output buffer 62 receives and buffers the signal output from signal synthesizer 58 and outputs a composite video picture signal to a monitor (not shown) or a system requiring the composite video picture signal via an output node OUT. Output buffer 62 improves driving performance and may be implemented by a folded cascade operational amplifier which is suitable for driving large capacitance and has a dominant pole at an output node. The current of the output node OUT is about 2 mA considering the slew rate due to the output driving capacity of output buffer 62.

Synchronous signal generating portion 20 operates as follows. Internal horizontal synchronous signal generator 80 receives clock signal 4 fsc from control portion 30. Internal horizontal synchronous signal generator 80 generates a horizontal synchronous signal having a period corresponding to 910 times that of clock signal 4 fsc, an internal equalizing pulse having a period corresponding to half the period of the horizontal synchronous signal, and an internal horizontal synchronous signal by combining the internal equalizing pulse and the horizontal synchronous signal.

Internal vertical synchronous signal generator 82 receives clock signal 4 fsc and generates an internal vertical synchronous signal having a period corresponding to 2.5 to 3 times that of clock signal 4 fsc.

Internal/external composite synchronous signal generating portion 84 determines whether to output the internal composite synchronous signal or the external composite synchronous signal responsive to control signal C2. That is, internal/external composite synchronous signal generator 84 outputs the internal composite synchronous signal if the external composite video signal is not received by control portion 30 and outputs the external composite synchronous signal if the external composite video signal is received by control portion 30. Internal/external composite synchronous signal generator 84 combines the internal vertical synchronous signal and the internal horizontal synchronous signal to generate an internal composite synchronous signal. Also, internal/external composite synchronous signal generator 84 outputs an external composite synchronous signal by combining the first external horizontal synchronous signal received from first horizontal synchronous signal generator 86 with the internal vertical synchronous signal.

First external horizontal synchronous signal generator 86 extracts a first external horizontal synchronous signal from the composite video signal externally input via input node IN1. First external horizontal synchronous signal generator 86 sends a state signal to internal/external composite synchronous signal generator 84. Internal/external composite synchronous signal generator 84 extracts the external horizontal synchronous signal from the composite video signal responsive to the state signal. If the external horizontal synchronous signal is extracted, internal/external composite synchronous signal generator 84 generates the external composite synchronous signal. That is, internal/external composite synchronous signal generator 84 generates an internal composite synchronous signal by synthesizing the internal vertical synchronous signal output from internal vertical synchronous signal generator 82 and the internal horizontal synchronous signal output from internal horizontal synchronous signal generator 80 responsive to control signal C2. Internal/external composite synchronous signal generator 84 generates an external composite synchronous signal by using the external vertical synchronous signal extracted from the composite video signal received at input node IN1 responsive to control signal C2.

Video signal compensating portion 100 includes mask signal generator 92 for generating a mask signal based on the external horizontal synchronous signal output from the first external horizontal synchronous signal generator 86. Video signal compensating portion 100 also includes PLL 96 and second external synchronous signal generator 94. Second external synchronous signal generator 94 generates a second external horizontal synchronous signal from the mask signal received from mask signal generator 92. PLL 96 compares the phase of the second external horizontal synchronous signal output from second external horizontal synchronous signal generator 94 with the phase of a feedback signal, oscillates the frequency at a rate corresponding to the compared result, multiplies the oscillated frequency by a predetermined value, and outputs the multiplied feedback signal to internal/external composite synchronous signal generator 84 as a third external horizontal synchronous signal.

In an OSD apparatus for adding a character signal to a motion video signal, PLL 96 outputs stable character and display clock signals synchronized with an external video signal. Where the external video signal includes noise components, mask signal generator 92 and second external horizontal synchronous signal generator 94 are additionally coupled to PLL 96, where PLL 96 is of a frequency synthesizer type, in order to remove noise signals which prevent the stabilization of PLL 96. Noise signals can include video track traveling switching noises and copy guard signals.

Internal/external composite synchronous signal generator 84 receives the third external horizontal synchronous signal output from PLL 96. In order to prevent jittering and distortion of the character caused by noise or copy guard signals applied to PLL 96, mask signal generator 92 generates a mask signal based on the external horizontal synchronous signal input thereto. For example, when mask signal generator 92 generates a logic high mask signal noise is removed from the external horizontal synchronous signal when the external horizontal synchronous signal is at a logic low. That is, in order to prevent character distortion induced from excessive phase detection error signals generated by uncompensated video head switching pulses, video signal compensating portion 100 generates a mask signal in a vertical blanking interval to hold the phase direction function of PLL 96 and maintain the central frequency of the voltage control oscillator included therein to a predetermined level within the holding interval thereby providing a stable synchronous signal during character display.

Synchronous signal delaying portion 88 receives an external or internal composite synchronous signal from internal/external composite synchronous signal generator 84, generates a one-shot horizontal synchronous signal, and outputs one-shot horizontal synchronous signal to dot clock signal generator 90. Generally, the position of a character to be displayed is determined based on the horizontal synchronous signal. The pulse width of the original horizontal synchronous signal may not coincide with the requirements of the system. When this happens, synchronous signal delaying portion 88 generates a one-shot horizontal synchronous signal having a predetermined width meeting the system requirements and which corresponds to the horizontal synchronous signal.

Dot clock signal generator 90 receives the one-shot horizontal synchronous signal and generates a dot clock signal DCLK. The frequency of dot clock signal DCLK, set for displaying a maximum of 30 characters on a screen, is typically 9 MHz. Dot clock signal generator 90 controls the start position and the horizontal size of the character. When the horizontal and vertical position start signals for displaying a character are determined, output data of ROM 52 is displayed on the screen from the start position generated by dot clock signal generator 90. The dot clock signal is related to the size of the character and is used to synchronize outputting ROM 52 data.

Figure 7:
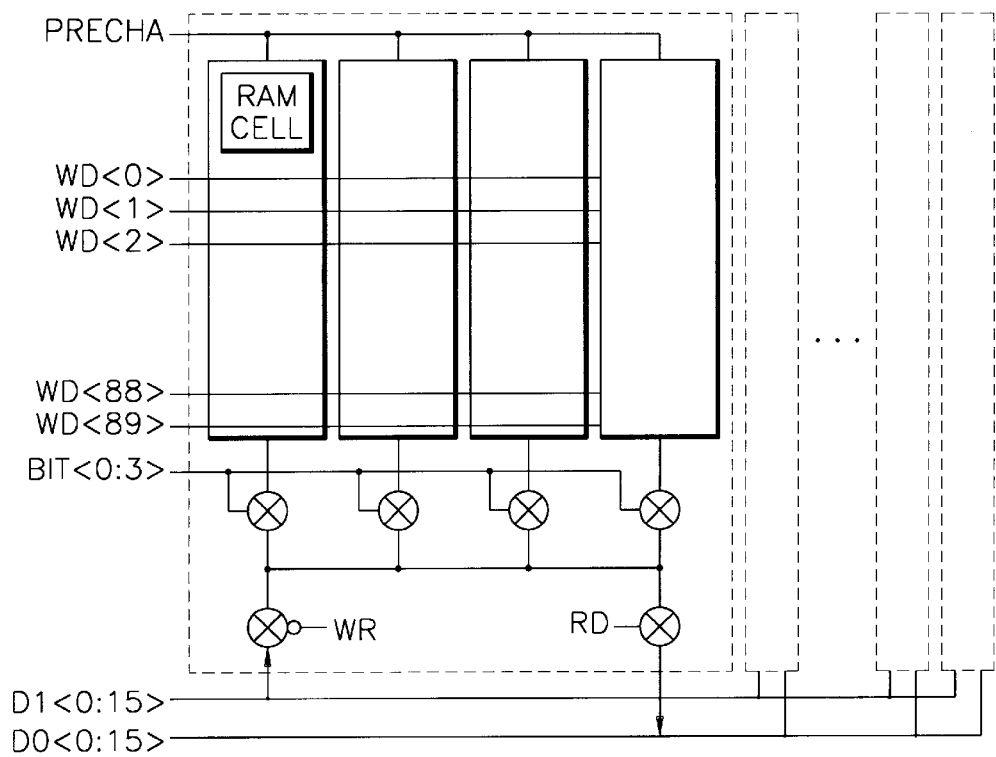
FIG. 7 is a conventional block diagram of RAM 50 shown in FIG. 1.

FIG. 7 is a conventional block diagram of RAM 50 shown in FIG. 1 wherein the RAM 50 is a static RAM (SRAM) including a plurality of RAM cells and multiplying portions.

Figure 8A:
FIGS. 8A through 8E are timing waveforms of the signals of each port shown in FIG. 7.
Figure 8B:
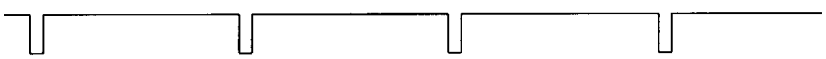
Figure 8C:
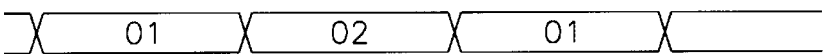
Figure 8D:
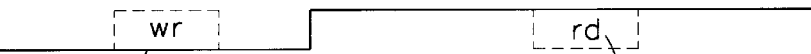
Figure 8E:
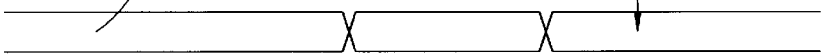

FIG. 8A is a timing diagram of clock signal SCK which is input to interface portion 40. FIG. 8B is a timing diagram of precharge signal PRECHA shown in FIG. 7. FIG. 8C is a timing diagram of a 9-bit address signal. FIG. 8D is a timing diagram of data write/read signal WD shown in FIG. 7. FIG. 8E is a timing diagram of data D0 and D1.

RAM 50 preferably comprises 5.76 KBits (360×16) used for reading/writing information on a maximum of 360 characters. When writing data, RAM 50 receives a write ROM address for the character to be displayed by a serial data input from control portion 30 via interface portion 40. When reading data, RAM 50 reads out the data by an address of RAM 50 which is determined according to a character line select bit and character size information.

Precharge signal PRECHA clears each RAM cell in advance of a read or write operation. That is, each RAM cell is first cleared by precharge signal PRECHA and then data is written into the RAM cell. Precharge signal PRECHA is generated from a clock signal.

Figure 9:
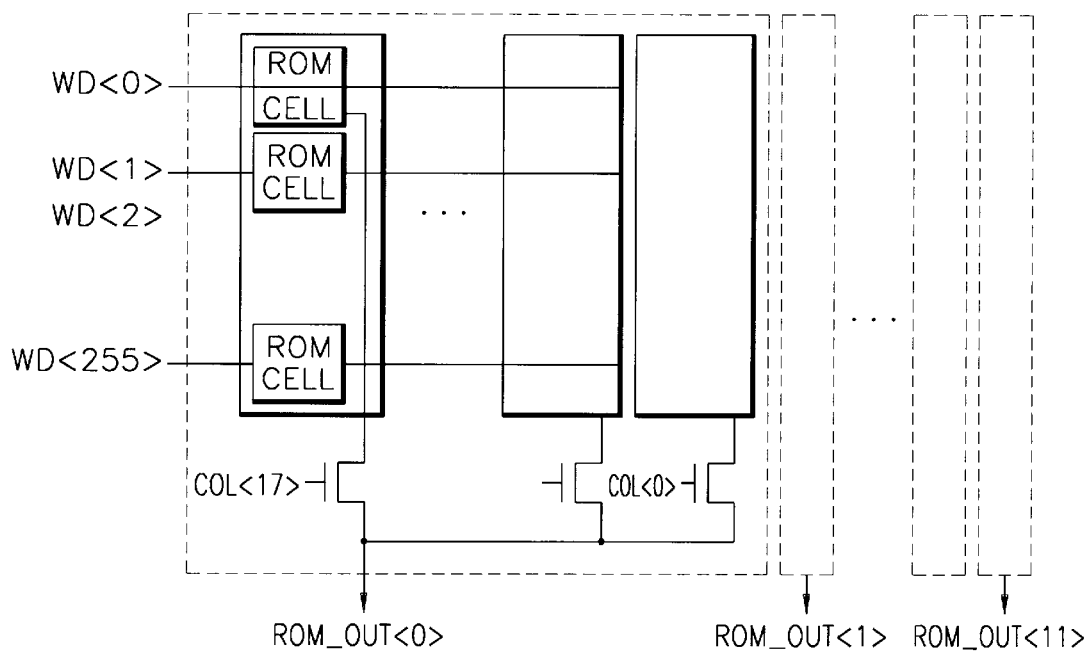
FIG. 9 is a conventional block diagram of ROM 52 shown in FIG. 1.

FIG. 9 is a conventional block diagram of ROM 52 shown in FIG. 1, including a plurality of ROM cells and ROM control transistors.

Figure 10A:
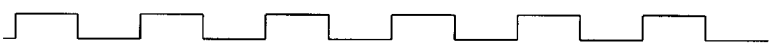
FIGS. 10A through 10D are timing waveforms of the signals of each portion shown in FIG. 9.
Figure 10B:
Figure 10C:
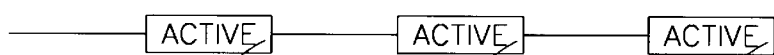
Figure 10D:
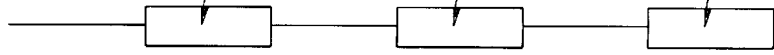

FIG. 10A is a waveform of clock signal SCK input to interface portion 40 shown in FIG. 1. FIG. 10B is a waveform of an 8-bit address. FIG. 10C is a waveform of an 18-bit control signal COL and FIG. 10D is a waveform of a 12-bit ROM output signal ROM_OUT output from ROM 52.

ROM 52 shown in FIG. 9 preferably comprises 55.296 KBits (12×18×256) for a total of 256 characters having a 12×18 matrix structure. Using the data output from RAM 50 as the address of ROM 52, eighteen bundles of 256 ROM cells are selected through a word line by a ROM decoder (not shown) and a bit line is selected by an internal column decoder (not shown) to output 12 bits of ROM data on ROM output signal ROM_OUT. The 12 bits of parallel ROM data are output to mixer 56 via parallel-to-serial data converter 54 as character and blank data.

Control portion 30 receives the user serial data input via input node IN2 and outputs the received serial data to OSD portion 10. Also, control portion 30 multiplies the frequency of system clock signal CK by a predetermined value to generate clock signal 4 fsc which controls OSD portion 10 and synchronous signal generating portion 20.

Figure 11:
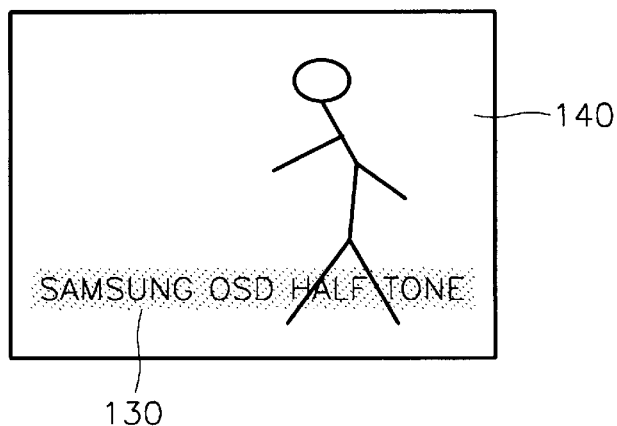
FIG. 11 is a diagram illustrating the half-tone conversion function of the present invention.

Methods for performing various OSD functions, including a half-tone box drawing, scroll, blink, and other functions using the OSD apparatus shown in FIG. 1 will be described with reference to FIGS. 11 to 13. The half-tone OSD function is used for highlighting a character displayed in a background screen by making the character display region 130 relatively darker than a non-character display region 140 where characters are not displayed. To do so, parallel-to-serial data converter 54 adjusts the DC level of the character data to be displayed according to the control data input from interface portion 40 and outputs a level-adjusted signal to mixer 56. Signal synthesizer 58 synthesizes the DC-level adjusted character data with composite video data input from clamp 60 and outputs the synthesized signal to output node OUT via output buffer 62 to display the character shown in FIG. 11.

The box drawing OSD function will be described with reference to FIG. 12. The box drawing function is used for highlighting a character or sentence displayed in three dimensions by surrounding it with a rectangular border. Parallel-to-serial data converter 54 generates box data based on the character or sentence data according to the control data input from interface portion 40 which determines whether to provide a protruded cubic effect or a recessed cubic effect to the displayed character or sentence. When providing the protruded cubic effect to the displayed character or sentence, the DC level adjuster (not shown) included in parallel-to-serial data converter 54 adjusts the DC level of the data located at lower right side 150 of the box as shown in FIG. 12 and outputs the result to mixer 56. When providing the recessed cubic effect, the DC level adjuster adjusts the DC level of the data located at upper left side 160 of the box as shown in FIG. 12 and outputs the result to mixer 56.

Figure 12:
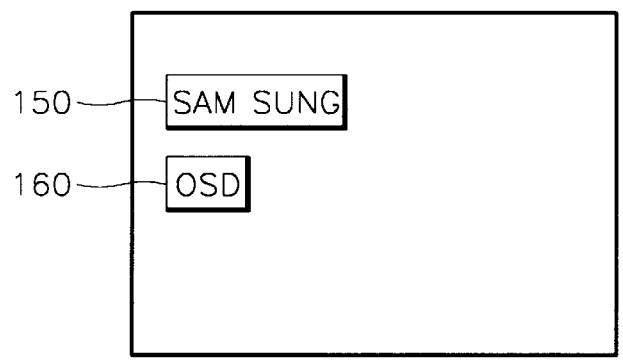
FIG. 12 is a diagram illustrating the box drawing function of the present invention.
Figure 13:
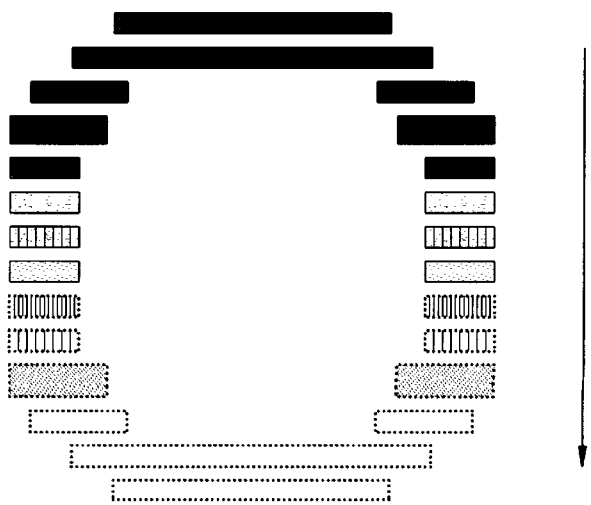
FIG. 13 is a diagram illustrating the scroll function of the present invention.

Signal synthesizer 58 synthesizes the box data, character data, and composite video data input from clamp 60 and outputs the synthesized signal to output node OUT via output buffer 62 to display the picture shown in FIG. 12.

The scroll OSD function will be described with reference to FIG. 13. According to the scroll OSD function, whether the character is on or off is controlled by displaying the character line by line in sequence thereby improving the visual effect of the displayed character. For example, the character '0' is displayed in sequence line by line in the arrow direction as shown in FIG. 13. To display a scrolled character, data stored in ROM 52 is read according to the dot address signal and the dot clock signal generated according to the vertical character start position signal and the vertical character size in vertical controller 46 shown in FIG. 1. Parallel-to-serial data converter 54 serially outputs the data read from ROM 52 according to the dot address signal and the dot clock signal to mixer 56 in response to the scroll control signal.

The scroll control signal is generated from a scroll controller (not shown) included in parallel-to-serial data converter 54. The scroll controller outputs the scroll control signal for controlling scroll time and a scroll on/off function according to the control data input from interface portion 40.

Mixer 56 mixes the internal or external composite synchronous signal, a background color signal, and data output from parallel-to-serial data converter 54 and outputs the result to signal synthesizer 58. The signal synthesizer 58 synthesizes the output from mixer 56 with the composite video signal input via clamp 60 during a scroll time interval and outputs the synthesized signal to output node OUT via output buffer 62 to display the picture shown in FIG. 13.

The blink OSD function is used for highlighting a displayed character by causing it to blink. To blink the displayed character, parallel-to-serial data converter 54 determines whether to perform the blinking function according to the control data input from interface portion 40. When performing the blinking function, the blink controller (not shown) included in parallel-to-serial data converter 54 outputs a blink control signal for controlling blinking time and intensity according to the input control data. Parallel-to-serial data converter 54 alternatively outputs to mixer 56 either blink data or character data input in parallel from ROM 52 responsive to the blink control signal.

Mixer 56 mixes the internal or external composite synchronous signal, a background color signal, and data alternatively output from parallel-to-serial data converter 54 and outputs the result to signal synthesizer 58. Signal synthesizer 58 synthesizes blank data and character data output from mixer 56 with the composite video signal input from clamp 60, and outputs the synthesized signal to output node OUT via output buffer 62 to display a picture on a monitor (not shown).

The OSD apparatus according to the present invention can control the size of the character to be displayed, as well as, perform the various above-described functions. The character size control function can be achieved by controlling the horizontal and vertical size of the character. A further OSD function for controlling the start point of the character to be displayed may be achieved by modifying the vertical and horizontal start position signals. In addition, the OSD apparatus of the present invention can perform a coloring OSD function for coloring the displayed character.

The OSD apparatus having various functions according to the present invention is preferably manufactured using a CMOS process with a double metal layer of 0.65 $\mu$m and is constituted of 7-KBytes of ROM, 760-bytes of RAM, and about 7,000 transistors. Also, the OSD apparatus of the present invention may be realized with a single chip driven by a 5V supply to a region of 2,900×2,900 $\mu$m.

As described above, 256 various characters can be displayed with a maximum of 300 displayed characters in a single screen using the OSD apparatus of the present invention. Signal compensating portion 100 compensates for recorder/reproducer misoperation by synchronizing the video signal and the character to be displayed on a screen without jittering and/or distortion. In addition, in order to satisfy various user demands, a character coloring, half-tone, scroll, box drawing, character start point control, character size control, blank region coloring, and blinking functions are provided by the OSD apparatus of the present invention. The OSD apparatus also outputs a composite video signal which is compatible with other video systems. Finally, the OSD apparatus of the present invention improves the driving performance of the output node by including an output buffer and reduces cost and improves reliability by being realized with a single chip.

What is claimed is:

1. An apparatus for performing a plurality of on-screen display functions on a character, the apparatus comprising:

control means for receiving user data and a system clock signal and generating serial data and a main clock signal;

synchronous signal generating means coupled to said control means for receiving the main clock signal and a composite video signal, generating an equalization pulse and internal horizontal and vertical synchronous signals responsive to the main clock signal, generating an internal composite synchronous signal by synthesizing the internal equalization pulse with the internal horizontal and vertical synchronous signals, generating an external composite synchronous signal corresponding to the composite video signal, and generating a dot clock signal responsive to the internal or external composite synchronous signal;

on-screen display means for receiving the serial data and either the internal or the external composite synchronous signal from the synchronous signal generating means, generating a character signal responsive to either the internal or the external composite synchronous signals, and providing the character signal to a monitor for displaying the character.

2. An apparatus for performing a plurality of on-screen display functions on a character, the apparatus comprising:

control means for receiving user data and a system clock signal and generating serial data and a main clock signal;

synchronous signal generating means coupled to said control means for receiving the main clock signal and a composite video signal, generating an equalization pulse and internal horizontal and vertical synchronous signals responsive to the main clock signal, generating an internal composite synchronous signal by synthesizing the internal equalization pulse with the internal horizontal and vertical synchronous signals, and generating an external composite synchronous signal corresponding to the composite video signal; and on-screen display means for receiving the serial data and either the internal or the external composite synchronous signal from the synchronous signal generating means, generating a character signal responsive to either the internal or the external composite synchronous signals, and providing the character signal to a monitor for displaying the character;

wherein said on-screen display means includes:

an interface portion for converting the serial data to parallel data;

a horizontal controller coupled to said interface portion for generating a horizontal character start position signal and a horizontal character size signal from the parallel data responsive to a vertical character start position signal and generating a horizontal clock signal responsive to the horizontal character size signal;

a timing generator coupled to said horizontal controller for generating a read address timing signal and a boundary timing signal responsive to the horizontal character start position signal and the horizontal character size signal;

a vertical controller coupled to said interface portion for detecting the vertical character start position signal and a vertical character size signal from the parallel data responsive to either the internal or the external composite synchronous signal, and generating an enable signal corresponding to the vertical character size position signal;

an address counter coupled to said interface portion for determining a RAM write address from the parallel data and a RAM read address from the vertical character size signal and vertical character position signal responsive to the read address timing signal;

a RAM coupled to said address counter and said interface portion for storing a ROM address as part of the parallel data responsive to the RAM write address and the RAM read address;

a ROM coupled to said RAM for storing character data in the ROM address responsive to the enable signal;

a parallel-to-serial data converter coupled to said horizontal converter for converting parallel character data received from said ROM to serial character data and providing either the serial character data or blank data to a parallel-to-serial converter output node responsive to the horizontal clock signal or the boundary timing signal;

a mixer for generating a mixer signal by mixing either the internal or the external composite synchronous signal and either the serial character data or the blank data output from said parallel-to-serial data converter; and a signal synthesizer for generating a synthesized signal by synthesizing the mixer signal with the composite video signal and providing the synthesized signal to the display.

3. The apparatus of claim 2 further including an output buffer coupled to said signal synthesizer for generating the character signal by buffering the synthesized signal and providing the character signal to the monitor.

4. The apparatus of claim 3 wherein said output buffer is a folded cascade operational amplifier.

5. The apparatus of claim 2 wherein said synchronous signal generating means includes:

a first external horizontal synchronous signal generator for extracting the external horizontal synchronous signal from the composite video signal; and a composite synchronous signal generator coupled to said first external horizontal synchronous signal generator for generating the internal composite synchronous signal and the internal equalization pulse responsive to the main clock signal and generating the external composite synchronous signal responsive to the external horizontal synchronous signal.

6. The apparatus of claim 5 wherein said synchronous signal generating means further includes:

a mask signal generator coupled to said first external horizontal synchronous signal generator for generating a mask signal corresponding to the external horizontal synchronous signal;

a second external horizontal synchronous signal generator coupled to said mask signal generator for generating a second external horizontal synchronous signal corresponding to the mask signal; and a phase locked loop coupled to said second external horizontal synchronous signal generator for determining a frequency difference between the second external horizontal synchronous signal and a feedback signal, generating a third horizontal synchronous signal having a frequency substantially equal to the frequency difference multiplied by a predetermined value, and providing the third external horizontal synchronous signal to said composite synchronous signal generator.

7. The apparatus of claim 5 wherein said composite synchronous signal generator includes an internal/external composite synchronous signal generator for generating the internal composite synchronous signal by synthesizing the internal horizontal synchronous signal with an internal vertical synchronous signal, the internal vertical synchronous signal having a predetermined period corresponding to a period of the horizontal synchronous signal, generating the external composite synchronous signal responsive to the composite video signal, providing the internal composite synchronous signal to said mixer, and providing the internal or external composite synchronous signal to said vertical controller.

8. The apparatus of claim 6 wherein said composite synchronous signal generator includes an internal/external composite synchronous signal generator for generating the internal composite synchronous signal by synthesizing the internal horizontal synchronous signal with an internal vertical synchronous signal, generating the external composite synchronous signal responsive to either the first or third external horizontal synchronous signal, providing the internal composite synchronous signal to said mixer, and providing the external composite synchronous signal to said vertical controller.

9. The apparatus of claim 5 wherein said synchronous signal generating means further comprises:

a synchronous signal delay portion for providing a one-shot horizontal synchronous signal upon receiving the external or internal horizontal synchronous signal; and a dot clock signal generator for generating a dot clock signal of the character to be displayed upon receiving the one-shot horizontal synchronous signal.

10. The apparatus of claim 6 wherein said synchronous signal generating means further comprises:

a synchronous signal delay portion for providing a one-shot horizontal synchronous signal upon receiving the external or internal horizontal synchronous signal; and a dot clock signal generator for generating a dot clock signal of the character to be displayed upon receiving the one-shot horizontal synchronous signal.

11. The apparatus of claim 2 wherein said on-screen display means further includes level adjusting means for generating a level-adjusted composite video signal by adjusting a voltage level of the composite video signal and providing the level-adjusted composite video signal to said signal synthesizer.

12. The apparatus of claim 11 wherein said level adjusting means comprises:

a pull-down resistor connected between a first power supply voltage and a second power supply voltage generating a reference voltage;

a comparator for generating a comparison signal by comparing the reference voltage with the composite video signal and providing the comparison signal to a comparison signal node; and a transistor having a gate, a drain, and a source, the gate connected to the comparison signal node for receiving the comparison signal and the drain and source connected between the first supply power voltage and the composite video signal.

13. The apparatus of claim 5 wherein said synchronous signal generating means further comprises a color generator coupled to said composite synchronous signal generator and said interface portion for generating a color burst signal corresponding to the internal horizontal synchronous signal and a background color signal corresponding to color information data contained in the parallel data, said color generator providing the color burst signal and the background color signal to said mixer responsive to the main clock.

14. An apparatus for performing a plurality of on-screen display functions, the apparatus receiving a composite video signal and user data, the apparatus comprising:

interface means for receiving serial data having a ROM address and at least one on-screen display function and converting the serial data into parallel data;

a RAM coupled to said interface means for storing the parallel data;

a ROM coupled to said RAM for storing character data of a character to be displayed;

level adjusting means for generating level-adjusted character data by adjusting the DC level of the character data corresponding to the parallel data; and signal synthesizing means coupled to said level adjusting means for generating a synthesized character signal by synthesizing the level-adjusted character data with either the externally input composite video signal or an internally generated background color signal and providing the synthesized character signal to a monitor for displaying the character.

15. The apparatus of claim 14 wherein the serial data includes a half-tone on-screen display function which displays a region in which the character is shown relatively darker than a region in which the character is not shown.

16. The apparatus of claim 14 wherein the serial data includes a box drawing on-screen display function which displays the character or a sentence bounded by a box and including a data generator coupled to said interface means for generating box data corresponding to the parallel data.

17. The apparatus of claim 14 wherein the serial data includes a scroll on-screen display function which displays the character in line-by-line sequence and including:

a vertical controller coupled to said interface means for generating a vertical start character position signal and a vertical character size signal corresponding to the parallel data and generating a dot address clock signal and a dot address corresponding to the vertical character size signal;

scroll control means coupled to said vertical controller for generating a scroll control signal for controlling scroll time and scroll on/off corresponding to the parallel data;

a parallel-to-serial data converter for converting character data received in parallel from said ROM to serial character data responsive to the scroll control signal;

a mixer coupled to said parallel-to-serial data converter for generating a mixer signal by mixing the background color signal and the serial character data; and a signal synthesizer for generating a synthesized signal by synthesizing the mixer signal with the composite video signal and providing the synthesized signal to the monitor for displaying the character.

18. The apparatus of claim 14 wherein the serial data includes a blink on-screen display function for blinking the displayed character and including:

blink control means coupled to said interface means for generating a blink control signal for controlling a blink interval between successive blinks and a blink duration corresponding to the parallel data; and a parallel-to-serial data converter for converting character data received in parallel from said ROM to serial character data and alternatively providing to said signal synthesizer character blink data or the serial character data responsive to the blink control signal.

19. A method for performing a plurality of on-screen display functions in an apparatus, the apparatus including a ROM and a RAM, the method comprising:

receiving a composite video signal;

extracting an external composite synchronous signal from the composite video signal;

generating an internal composite synchronous signal responsive from the composite video signal;

generating a background color signal from the composite video signal;

receiving user data having a ROM address at which character data is stored and an on-screen display function for displaying a character on a monitor;

reading the character data from the ROM at the ROM address;

generating a displayed character signal by synthesizing the character data with either the composite video signal or the background color signal;

providing the displayed character signal to the monitor; and using the displayed character signal to display the character on the monitor.

20. The method of claim 19 wherein the user data includes a half-tone on-screen display function which displays a region in which the character is shown relatively darker than a region in which the character is not shown, the method including:
  adjusting the DC level of the character data after reading the character data from the ROM; and
  generating a mixed signal after adjusting the DC level of the character data by mixing the level-adjusted character data with the internal or the external composite synchronous signal; and
  wherein generating a displayed character signal includes synthesizing the mixed signal with either the composite video signal or the background color signal.

21. The method of claim 19 wherein the user data includes a box drawing on-screen display function which displays the character or a sentence bounded by a box, the method including generating box data corresponding to the user data before generating a displayed character signal and wherein generating a displayed character signal includes synthesizing the box data with the character data and either the composite video signal or the background color signal.

22. The method of claim 21 further including:
  choosing a protruded cubic box effect or a recessed cubic box effect for the character or sentence to be displayed after generating box data; and
  adjusting the DC current level of the character data according to the choice of box effects.

23. The method of claim 19 wherein the user data includes a scroll on-screen display function which displays the character in line-by-line sequence, the method including:
  determining whether to perform the scroll function responsive to the user information; and
  determining a scroll time after determining to perform the scroll function;
  wherein using the displayed character signal includes using the scroll time to display the character on the monitor.

24. The method of claim 19 wherein the user data includes a blink on-screen display function for blinking the displayed character, the method including:
  determining a blink time interval and a blink duration according to the character data; and
  wherein generating the synthesized signal includes alternatively synthesizing blank data or the character data with the composite video signal or the background color signal according to the blink time interval and the blink duration.

* * * * *